(12) United States Patent
Blanchino et al.

(10) Patent No.: US 8,667,889 B2
(45) Date of Patent: Mar. 11, 2014

(54) MACHINE FOR THE PREPARATION OF BEVERAGES BY INFUSION USING CARTRIDGES

(75) Inventors: Francesco Blanchino, Mozzate (IT); Mauro Manunta, Tradate (IT)

(73) Assignee: Mitaca S.r.l., Frazione Malvaglio (Milano) (IT)

( * ) Notice: Subject to any disclaimer, the term of this patent is extended or adjusted under 35 U.S.C. 154(b) by 159 days.

(21) Appl. No.: 13/255,974

(22) PCT Filed: Mar. 10, 2010

(86) PCT No.: PCT/EP2010/053042
§ 371 (c)(1), (2), (4) Date: Sep. 12, 2011

(87) PCT Pub. No.: WO2010/103044
PCT Pub. Date: Sep. 16, 2010

(65) Prior Publication Data
US 2012/0000371 A1 Jan. 5, 2012

(30) Foreign Application Priority Data
Mar. 12, 2009 (IT) .............................. BG2009A0009

(51) Int. Cl.
*A47J 31/40* (2006.01)
(52) U.S. Cl.
USPC .......................... 99/289 R; 99/295; 99/302 P

(58) Field of Classification Search
USPC ...................... 99/295, 289 R, 302 P
See application file for complete search history.

(56) References Cited

U.S. PATENT DOCUMENTS

| | | | | |
|---|---|---|---|---|
| 5,755,149 | A * | 5/1998 | Blanc et al. ................... | 99/289 T |
| 6,584,888 | B2 * | 7/2003 | Cortese ........................ | 99/289 R |
| 7,350,456 | B2 * | 4/2008 | Blanc et al. ................... | 99/302 P |
| 8,176,840 | B2 * | 5/2012 | Jarisch ......................... | 99/289 R |

FOREIGN PATENT DOCUMENTS

EP  1 859 714  11/2007
WO  03/073897  9/2003

OTHER PUBLICATIONS

International Search Report dated Jul. 13, 2010, corresponding to the PCT application.

* cited by examiner

*Primary Examiner* — Reginald L Alexander
(74) *Attorney, Agent, or Firm* — Young & Thompson

(57) ABSTRACT

A machine for the preparation of beverages by infusion using cartridges; the machine includes an infusion assembly; characterized in that the infusion assembly includes: a slide for introduction of a single cartridge; a lever for operation of a piston; the piston suitable to move rectilinearly along a direction and having a first resting position and a second working position; a chamber suitable for receiving the cartridge; the slide being positioned in an intermediate position between the first resting position and the second working position; the slide having a predefined resting position so that the capsule is positioned resting on an edge of the chamber.

7 Claims, 3 Drawing Sheets

MACHINE FOR THE PREPARATION OF BEVERAGES BY INFUSION USING CARTRIDGES

The present invention refers to a machine for the preparation of coffee beverages or other types of beverages by infusion. The infusion is prepared by means of cartridges (pods). The cartridges are normally made of plastic material or aluminium and are structured with a cylindrical hollow body. The upper and lower surfaces comprise small holes and to possibly a filtering film placed on the inside of said surfaces, or they are pierced by means of points situated in the chamber and in the piston. They are generally provided with a protruding edge on their upper surface as a supporting means.

There are various automatic or semi-automatic machines that make use of these cartridges.

These machines must be designed for insertion of the new cartridge and ejection of the used one.

Various methods of insertion and ejection of the cartridge are therefore known to the art. Object of the present invention is to provide a new machine for preparation of coffee beverages and other beverages, that allows guided introduction of the cartridge, positioning of the cartridge, blocking of the cartridge during infusion and ejection thereof.

Another object is that of providing a machine of limited size and having few moving parts.

A further object is that of defining a machine that consists of simple, reliable devices.

According to the present invention, these objects and others still are achieved with a machine for the preparation of beverages using a cartridge; said machine comprises an infusion assembly, characterized in that said infusion assembly comprises: a slide for introducing a single cartridge; a lever for operating a piston; said piston suitable for moving rectilinearly along a direction and having a first resting position and a second working position; a chamber suitable to receive said capsule; said slide being positioned in an intermediate position between said resting position and said working position; said slide having a predefined resting position so that said cartridge is positioned resting on an edge of said chamber.

Further characteristics of the invention are described in the dependent claims.

The characteristics and advantages of the present invention will be made clear by the following detailed description of a practical embodiment thereof, illustrated by way of non limiting example in the appended drawings, wherein.

Figure 1:
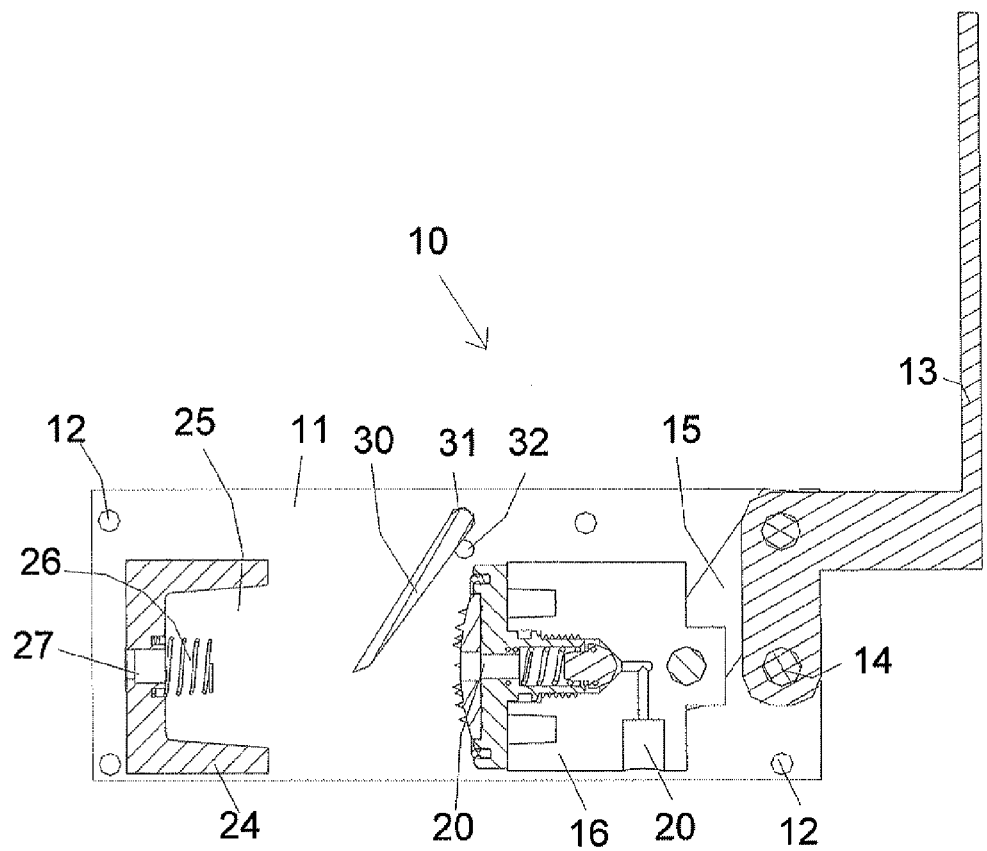
FIG. 1 shows diagrammatically a side view and a sectional view of an open infusion assembly, in accordance with the present invention.
Figure 2:
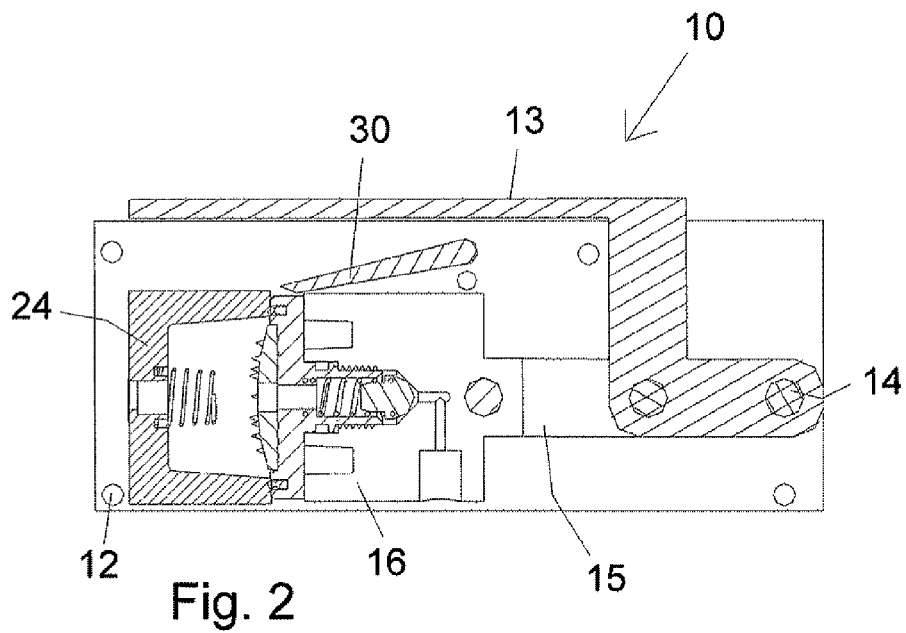
FIG. 2 shows diagrammatically a side view and a sectional view of a closed infusion assembly, in accordance with the present invention.

Referring to the appended figures, a machine for the preparation of coffee beverages, in accordance with the present invention, comprises an infusion assembly 10.

The infusion assembly 10 comprises a pair of containment shoulders 11 for said assembly, joined to each other by pins for which the relevant holes 12 can be noted.

A lever 13 is pivoted on a pin 14, fixed to the shoulders 11.

The lever 13 is integral with the connecting rods 15, in turn connected to a piston 16.

The piston 16 comprises lateral protrusions which slide along guides (longitudinal grooves) situated in the shoulders 11.

The piston 16 comprises pipes 20, passing therein, to provide water to a cartridge 21, a gasket 22 and a head 23 for pushing the cartridge 21.

The infusion assembly further comprises a chamber 24.

The chamber 24 has a cavity 25 in the area in front of the piston 16 where the cartridge 21 can be housed.

In the bottom thereof there is a leaf spring 26, or an elastic pusher means, for the cartridge 21, and rearward thereof there is situated a hole 27 for outlet of the infusion.

The infusion assembly 10 also comprises a slide 30 which can rotate around a pin 31, from a substantially horizontal position to a slightly downward sloping position blocked by a catch 32. The slide is inclined by about 30° with respect to the vertical and in any case between 10° and 50°.

Operation of the device according to the invention is obvious from what is described and illustrated and is essentially as follows.

Figure 3:
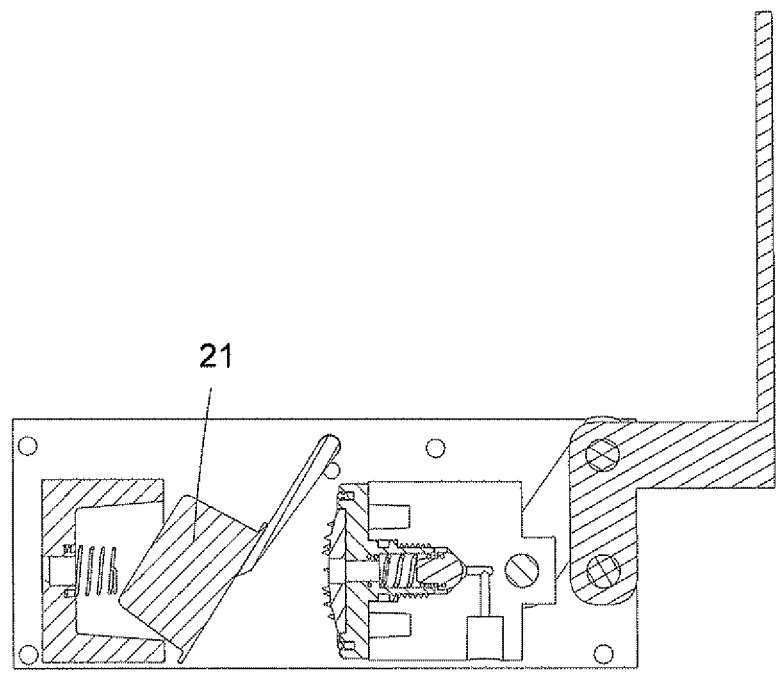
FIG. 3 shows diagrammatically a side view and a sectional view of an infusion assembly during a step of insertion of the cartridge, in accordance with the present invention.
Figure 4:
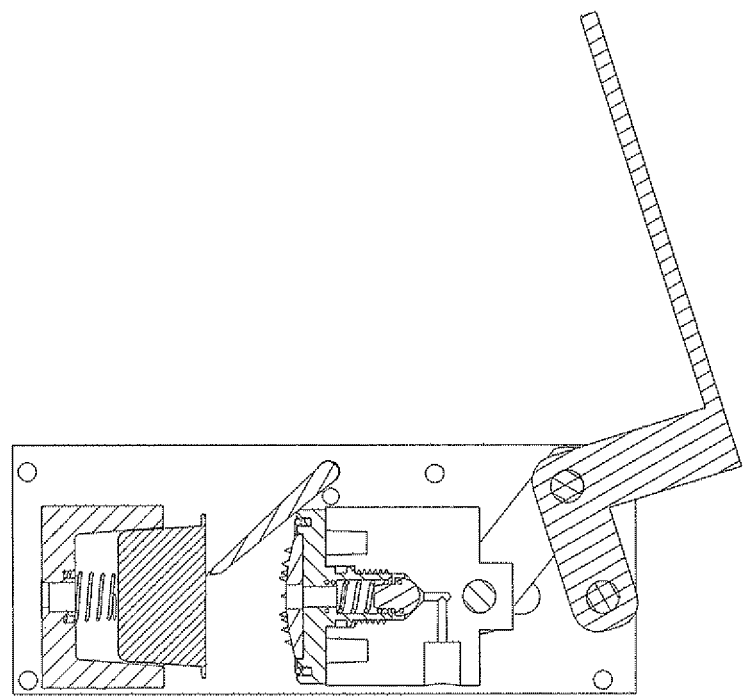
FIG. 4 shows diagrammatically a side sectional view of an infusion assembly during an initial step of closure, in accordance with the present invention.
Figure 5:
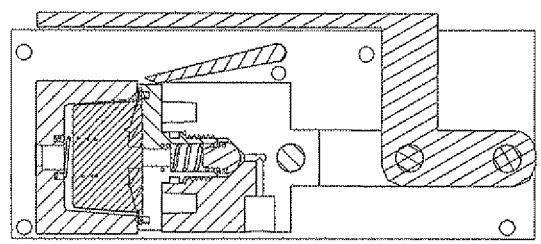
FIG. 5 shows diagrammatically a side sectional view of an infusion assembly during a step of closure, in accordance with the present invention.
Figure 6:
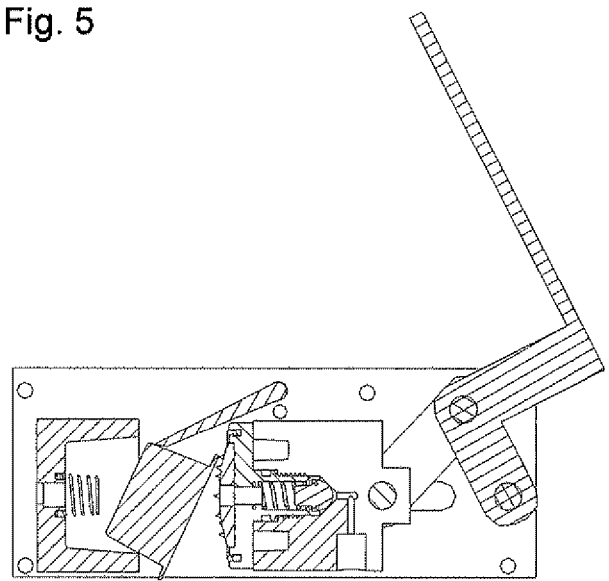
FIG. 6 shows diagrammatically a side sectional view of an infusion assembly during an initial step of opening, in accordance with the present invention.
Figure 7:
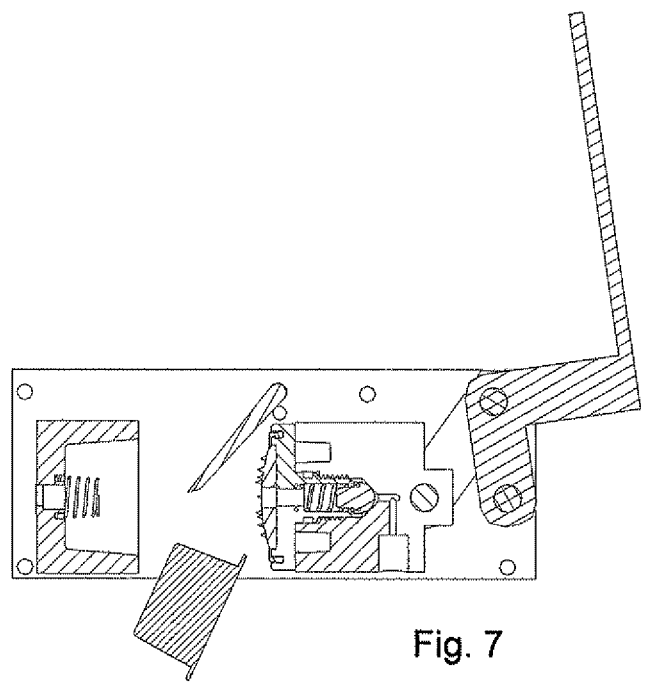
FIG. 7 shows diagrammatically a side sectional view of an infusion assembly during a step of ejection of the cartridge, in accordance with the present invention.

The user, with the lever 13 in the open position, as illustrated in FIG. 3, inserts the capsule 21, making it slide along the slide 30, which is blocked in position by the catch 32.

The cartridge 21 obligatorily stops against the underlying edge of the chamber 24, in an inclined position.

This is due to the fact that the distance between the point of the slide, in the resting position, pre-set by the catch 32 and the outer edge of the chamber 24, must be less than the height of the cartridge 21. The length of the slide 30 is determined in such a way that in the resting position the point of the slide 30 is positioned on the central axis of the chamber 24.

At this point the operator manually or by means of an automatic action, brings the lever 13, or in any case any other means suitable to make the piston 16 translate from its resting position to its working position, that is, into its closing position, thus allowing translation of the piston 16 towards the cartridge 21. In this manner, the piston 16 intercepts the slide 30, which straightens the cartridge 21. Continuing its forward stroke, the piston 16 completely raises the slide 30 and pushes the capsule 21 into the chamber 24, overcoming the resistance of the spring 26.

A suitable sensor (not shown) will operate the supply of water to the infusion assembly 10 and the infusion will be dispensed to the user.

On reopening of the infusion assembly 10, that is, when the user opens the lever 13 again to return it to the vertical position, the piston 16 moves back and at the same time the slide 30 comes to rest by gravity on the cartridge 21, and the spring 26 in turn pushes the cartridge 21, which moves back.

The piston 16, having returned to its initial position, leaves ample space for the cartridge to fall downwards.

The distance between the piston 16 in its resting position and the outer edge of the chamber 24 must be such that the cartridge is allowed to rotate as it exits to avoid being blocked inside the infusion assembly. Said distance will therefore be equal to or greater than the diameter of the cartridge.

The above described infusion assembly 10 can essentially be adapted to any type of cartridge. In particular, it is also suitable for cartridges not having the usual pronounced edge.

The lever 13 can be operated manually or can be operated by a suitable electric motor with the relevant speed reducer, operated, for example, by a sensor (or switch) activated at the time of insertion of the cartridge into the infusion assembly 10.

Because of its shape, said infusion assembly 10 can also be advantageously used with automatic magazines, by placing a magazine near to the slide.

The infusion assembly 10 will not be described in further detail in that on the basis of what is set out above, a person skilled in the art is able to produce it.

The materials used, as well as the sizes, can be of any kind according to requirements and the state of the art.

The infusion assembly 10 thus conceived is susceptible of numerous modifications and variants, all coming within the scope of the inventive concept; furthermore all the details may be replaced by technically equivalent elements.

The invention claimed is:

1. A machine for the preparation of beverages by means of infusion using cartridges, said machine comprising:
    an infusion assembly, said infusion assembly comprising a rotatable slide for introducing a single cartridge;
    a lever for operating a piston, said piston movable rectilinearly in a direction and having a first resting position and a second working position;
    a chamber that receives said cartridge, said slide being positioned in an intermediate position between said first resting position and said second working position,
    said slide being rotatable around a pin, from a substantially horizontal position to a downward sloping position blocked by a catch,
    said slide having a pre-set resting position so that said cartridge is positioned resting, in an inclined position, on an outer edge of said chamber for receiving the single cartridge, and a distance between a tip point of the slide and said outer edge of the chamber is less than a height of the cartridge such that first in said resting position, the tip point of the slide is positioned on a central axis of the chamber (24).

2. A machine in accordance with claim 1 wherein the resting position said slide is inclined, with respect to the vertical, by an angle between 10° and 50°.

3. A machine in accordance with claim 1, wherein the distance between said piston in its first resting position and the outer edge of said chamber is equal to or greater than the diameter of said cartridge.

4. A machine in accordance with claim 1, wherein said infusion assembly comprises a lever coupled to said piston by means of a connecting rod.

5. A machine in accordance with claim 1, wherein said piston comprises pipes inside it for the passage of water.

6. A machine in accordance with claim 1 wherein the bottom of said chamber there is situated an elastic pushing means.

7. A machine in accordance with claim 1, wherein the inclined position of said slide, in the resting position of said slide, is 30°, with respect to the vertical.

* * * * *